(12) United States Patent
Bailey et al.

(10) Patent No.: US 10,496,720 B2
(45) Date of Patent: Dec. 3, 2019

(54) SYSTEMS AND METHODS FOR PROVIDING FEED PREFERENCE SURVEYS IN A SOCIAL NETWORKING SYSTEM

(71) Applicant: Facebook, Inc., Menlo Park, CA (US)

(72) Inventors: Michael Charles Bailey, Menlo Park, CA (US); Alexander Peysakhovich, San Francisco, CA (US); Virot Chiraphadhanakul, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 365 days.

(21) Appl. No.: 15/229,054

(22) Filed: Aug. 4, 2016

(65) Prior Publication Data

US 2018/0039702 A1    Feb. 8, 2018

(51) Int. Cl.
*G06F 17/30* (2006.01)
*G06F 16/9535* (2019.01)
*G06N 20/00* (2019.01)
*G06F 16/25* (2019.01)

(52) U.S. Cl.
CPC ........ *G06F 16/9535* (2019.01); *G06F 16/252* (2019.01); *G06N 20/00* (2019.01)

(58) Field of Classification Search
USPC ...................... 707/748; 706/14, 46
See application file for complete search history.

(56) References Cited

U.S. PATENT DOCUMENTS

| 8,738,698 | B2 | 5/2014 | Yan | |
|---|---|---|---|---|
| 10,007,732 | B2 * | 6/2018 | Bennett | G06F 17/30867 |
| 2012/0143802 | A1 * | 6/2012 | Balakrishnan | G06Q 30/0203 706/14 |
| 2013/0041860 | A1 * | 2/2013 | Lawrence | G06Q 10/10 706/46 |
| 2015/0254371 | A1 * | 9/2015 | Zhang | H04L 67/306 707/798 |
| 2019/0014354 | A1 * | 1/2019 | Ioffe | H04N 21/2183 |

\* cited by examiner

*Primary Examiner* — Hung T Vy
(74) *Attorney, Agent, or Firm* — Sheppard Mullin Richter & Hampton LLP

(57) ABSTRACT

Systems, methods, and non-transitory computer readable media are configured to select a first content item and a second content item to display to each user of a plurality of users in pairwise comparison in a survey associated with a content feed of the user. A selection by each user of the plurality of users of one of the first content item and the second content item can be obtained via a user interface. A ranking model configured to assign a score indicative of quality of each content item of a plurality of content items associated with content feeds based at least in part on the selections by the plurality of users can be determined.

20 Claims, 9 Drawing Sheets

400

Select a first content item and a second content item to display to each user of a plurality of users in pairwise comparison in a survey associated with a content feed of the user
402

Obtain a selection via a user interface by each user of the plurality of users of one of the first content item and the second content item
404

Determine a ranking model configured to assign a score indicative of quality of each content item of a plurality of content items associated with content feeds based at least in part on the selections by the plurality of users
406

FIGURE 4

SYSTEMS AND METHODS FOR PROVIDING FEED PREFERENCE SURVEYS IN A SOCIAL NETWORKING SYSTEM

FIELD OF THE INVENTION

The present technology relates to the field of social networks. More particularly, the present technology relates to techniques for preference surveys in social networking systems.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

A social networking system may provide user profiles for various users through which users may add friends or contacts, or provide, post, or publish content items. In one example, a user (or entity) of the social networking system can post or publish a content item, which can be provided or presented on a profile page, such as on the user's timeline or on another user's timeline. In another example, the content item can be provided or presented through a feed, such as a newsfeed, for the user or for another user to view and access. The user can interact with a content item in the feed, for example, by liking the content item, commenting on the content item, sharing the content item, etc. Content items presented in the feed for the user can be determined based on various factors.

SUMMARY

Various embodiments of the present technology can include systems, methods, and non-transitory computer readable media configured to select a first content item and a second content item to display to each user of a plurality of users in pairwise comparison in a survey associated with a content feed of the user. A selection by each user of the plurality of users of one of the first content item and the second content item can be obtained via a user interface. A ranking model configured to assign a score indicative of quality of each content item of a plurality of content items associated with content feeds based at least in part on the selections by the plurality of users can be determined.

In some embodiments, the ranking model is determined based at least in part on a machine learning model.

In certain embodiments, the ranking model is based at least in part on a plurality of features associated with content items, and the determining the ranking model comprises determining a weight for each feature of the plurality of features.

In an embodiment, the ranking model and the weight for each feature of the plurality of features are determined based at least in part on a utility function.

In some embodiments, the ranking model and the weight for each feature of the plurality of features are determined based at least in part on a logistic regression.

In certain embodiments, the survey is provided to each user in real time, and the first content item is a viral content item.

In an embodiment, a first score indicative of quality of the first content item to the first content item can be assigned based at least in part on the ranking model. Whether selections of the first content item by the plurality of users are below a threshold can be determined. The first score can be adjusted in response to determining that the selections of the first content item by the plurality of users are below the threshold.

In some embodiments, the ranking model can be modified. Scores indicative of quality of content items included in the survey associated with the content feed of each user can be assigned using the modified ranking model. The assigned scores of the content items included in the survey and the selections by the plurality of users can be compared.

In certain embodiments, the plurality of users are located in a plurality of geographical areas, and the selections by one or more of the plurality of users in a particular geographical area of the plurality of geographical areas are analyzed.

In an embodiment, a ranking model associated with the particular geographical area is determined.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 4 illustrates an example first method for providing pairwise comparisons for surveys, according to an embodiment of the present technology.

Figure 1:
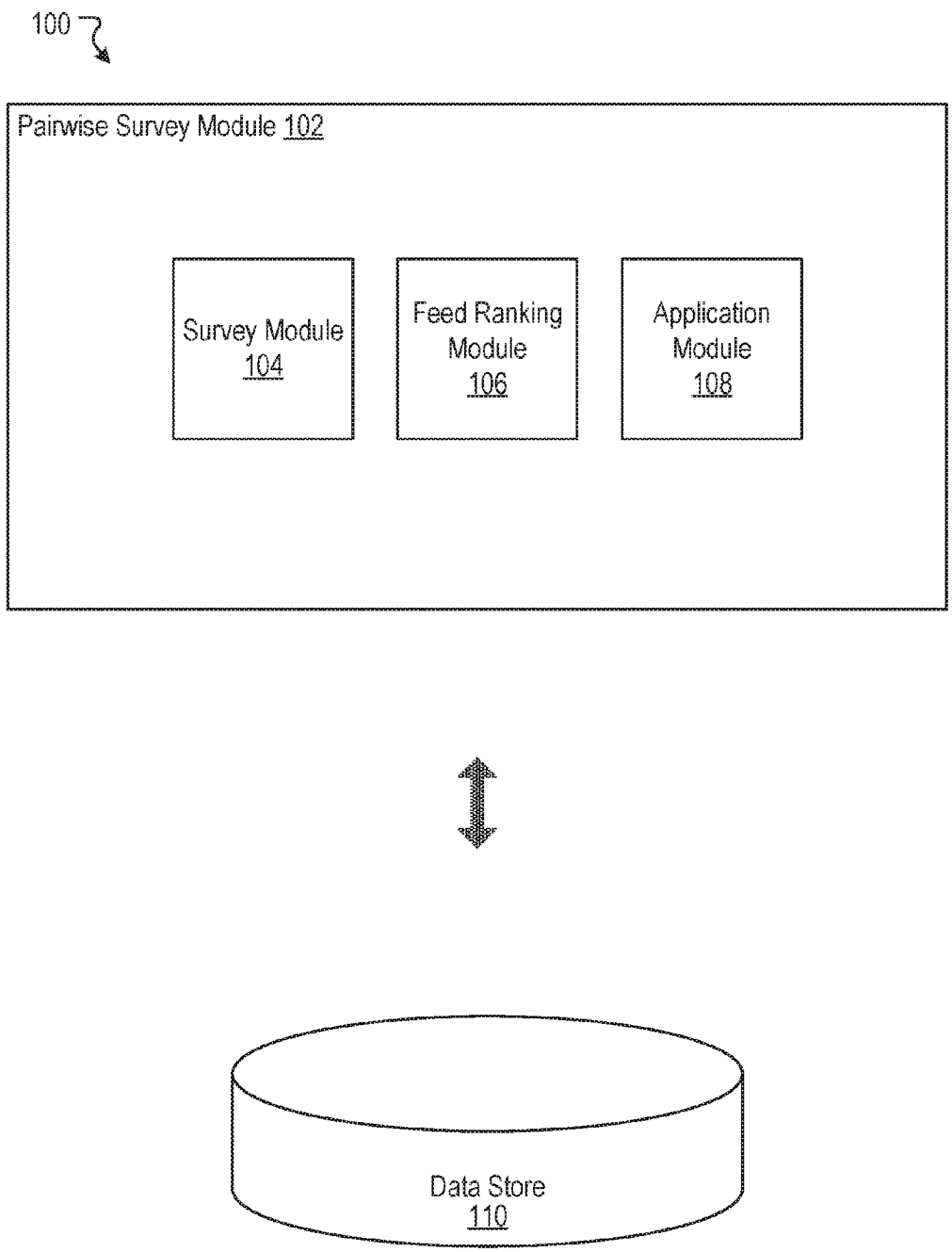
FIG. 1 illustrates a system including an example pairwise survey module configured to provide pairwise comparisons for surveys, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Feed Preference Surveys in a Social Networking System

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (e.g., a social networking service, a social network, etc.). A social networking system may provide user profiles for various users through which users may add friends or contacts, or provide, post, or publish content items. In one example, a user (or entity) of the social networking system can post or publish a content item, which can be provided or presented on a profile page, such as on the user's timeline or on another user's timeline. In another example, the content item can be provided or presented through a feed, such as a newsfeed, for the user or for another user to view and access. The user can interact with a content item in the feed, for example, by liking the content item, commenting on the content item, sharing the content item, etc. Content items presented in the feed for the user can be determined based on various factors.

Conventional approaches specifically arising in the realm of computer technology can estimate the quality of content items and determine which content items to include in a user's feed based on the estimated quality. For example, conventional approaches may consider a user's interactions with content items in order to estimate the quality of the content items. Examples of a user's interactions with content items can include liking, commenting, sharing, etc. However, user interactions may not be good indicators of the quality of content items. For example, a user can like a content item although the user does not prefer the content item over another content item. In some cases, conventional approaches may request a user to rate content items on a scale (e.g., a rating of 1 through 5) in order to estimate the quality of the content items. However, rating on a multi-point scale may not be highly reflective of the quality of content items, especially in the presence of differential item functionality and low quality inputs. For example, differential item functionality can exist when different scale points can have different meanings to different users. Low quality inputs can result due to users' lack of attention or understanding, or due to noise in measured inputs.

An improved approach rooted in computer technology can overcome the foregoing and other disadvantages associated with conventional approaches specifically arising in the realm of computer technology. Based on computer technology, the disclosed technology can utilize pairwise comparison of content items to estimate the quality of content items and determine a ranking model or algorithm for estimating the quality of content items. The disclosed technology can use the estimated quality of content items to determine which content items to include in a user's feed. A user can be presented with a survey that includes one or more pairwise comparisons. Each pairwise comparison can include two content items, from which the user selects one. Selections by users in pairwise comparisons can be collected and analyzed in order to estimate the quality of content items. Pairwise comparison results reflecting selections by users in pairwise comparisons can indicate user preference of different users in connection with content items.

Pairwise comparison results can have many applications. Pairwise comparison results can be used to determine a ranking model or algorithm for estimating the quality of content items. For example, pairwise comparison results can also be used to determine weights or coefficients used in the ranking model or used to derive the ranking model. The ranking model can assign a score indicative of quality to each content item. In some cases, pairwise comparison results can also be used to determine which features associated with content items are good indicators of quality of content items. Examples of features of a content item can include subject type, content type, closeness of users, probability of liking the content item, probability of commenting on the content item, probability of clicking on the content item, probability of sharing the content item, etc. A ranking model can be modified to include features that are good indicators of quality or to remove features that are not good indicators of quality. Pairwise comparison results can also be used to determine whether a ranking model or algorithm can accurately predict the quality of content items. Since surveys can be presented to users in real time or live, pairwise comparison results can also be used to estimate the quality of a trending content item (e.g., a viral video) and determine whether the trending content item should be included in users' feeds over other content items. Pairwise comparison results can be used to obtain insights about differences in preferences for content items between different regions (e.g., countries).

Pairwise comparisons can be more efficient and more accurate in estimating the quality of content items. For example, in the presence of differential item functionality and/or low quality inputs, pairwise comparisons can obtain more accurate estimates of the quality of content items. By presenting only two choices, pairwise comparisons can reduce the probability of different scale points having different meanings to users and can reduce the probability of noise in measuring inputs. Pairwise comparisons can also be completed quickly by users and can be easy to implement and scale.

FIG. 1 illustrates an example system 100 including an example pairwise survey module 102 configured to provide pairwise comparisons for surveys, according to an embodiment of the present technology. The pairwise survey module 102 can include a survey module 104, a feed ranking module 106, and an application module 108. In some instances, the example system 100 can include at least one data store 110. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the pairwise survey module 102 can be implemented in any suitable combinations.

The survey module 104 can generate surveys using pairwise comparisons. A survey can be presented to a user and can include one or more pairwise comparisons. For example, a survey can include a single pairwise comparison or a series of pairwise comparisons. The survey can be presented to a user in a user interface of the social networking system. For example, the survey can be available from the user's feed and can be presented in the user interface when the user chooses to participate in the survey. The survey module 104 can create a survey dynamically when a user chooses to participate or can be created beforehand and presented to a user upon request. The survey module 104 can provide surveys to users in or near real time.

The survey module 104 can select two content items to be shown to a user in a pairwise comparison. The survey module 104 can select two content items for a pairwise comparison randomly based on any suitable algorithm or technique. Content items selected for pairwise comparisons can be content items that are included in a user's feed or content items that are potential candidates to be included in a user's feed. For example, content items can include status updates, images, videos, links, etc. Content items can be associated with one or more features that may factor into the quality of the content items. For instance, examples of features relating to content items can include subject of a content item, subject type of the content item, content type of the content item, closeness or degrees of separation of friends or contacts who posted the content item and a user who accesses the content item, probability of liking the content item, probability of commenting on the content item, probability of clicking on the content item, probability of sharing the content item, length of text of the content item, inclusion of a link in the content item, etc. In some embodiments, the survey module 104 can select two content items for a pairwise comparison based on the features of the content items or values of the features. For example, the survey module 104 can select two content items that have the same values for a first feature and have different values for a second feature, etc. Many variations are possible.

Content items included in a survey can be different for different users. In some embodiments, content items can be selected from content items posted by a user's friends, contacts, or other types of connections in the social networking system. Since users can have different connections from each other, content items available for presentation to users in a survey can be different.

The survey module 104 can obtain pairwise comparison results from surveys. A user can select one of the two content items in a pairwise comparison. Such a selection can indicate the user's preference of the selected content item over the other unselected content item. The survey module 104 can receive a user selection for each pairwise comparison in a survey. The survey module 104 can obtain and store pairwise comparison results from surveys in the data store 110 for analysis.

The survey module 104 can determine pairwise scores for each content item based on pairwise comparison results. For example, a pairwise score for a content item i can be determined as follows:

$$\text{pairwise\_score}_i = \frac{\text{number of users preferred}_i}{\text{number of users viewed}_i} \quad (1)$$

Pairwise scores for content items can be used in determining a ranking model or algorithm for estimating the quality of content items. Determining a ranking model or algorithm for estimating the quality of content items is described in more detail herein.

The feed ranking module 106 can determine, adjust, or evaluate a ranking model or algorithm for estimating the quality of content items. For example, the feed ranking module 106 can determine the ranking model for estimating the quality of content items. The ranking model can include certain features associated with content items, and the feed ranking module 106 can also determine the weights for the features included in the ranking model. The feed ranking module 106 is described in more detail herein.

The application module 108 can utilize pairwise comparison results for various applications. For example, the application module 108 can use pairwise comparison results to analyze certain content items in or near real time (e.g., viral content items). The application module 108 can also use pairwise comparison results to analyze preference for content items in different regions (e.g., countries). The application module 108 is described in more detail herein.

In some embodiments, the pairwise survey module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the pairwise survey module 102 can be, in part or in whole, implemented as software running on one or more computing devices or systems, such as on a server system or a client computing device. In some instances, the pairwise survey module 102 can be, in part or in whole, implemented within or configured to operate in conjunction or be integrated with a social networking system (or service), such as a social networking system 630 of FIG. 6. Likewise, in some instances, the pairwise survey module 102 can be, in part or in whole, implemented within or configured to operate in conjunction or be integrated with a client computing device, such as the user device 610 of FIG. 6. For example, the pairwise survey module 102 can be implemented as or within a dedicated application (e.g., app), a program, or an applet running on a user computing device or client computing system. It should be understood that many variations are possible.

The data store 110 can be configured to store and maintain various types of data, such as the data relating to support of and operation of the pairwise survey module 102. The data maintained by the data store 110 can include, for example, information relating to pairwise comparisons, pairwise comparison surveys, pairwise comparison results, ranking algorithms or models, content items, features associated with content items, feeds associated with users, various applications of pairwise comparison results, etc. The data store 110 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the pairwise survey module 102 can be configured to communicate and/or operate with the data store 110. In some embodiments, the data store 110 can be a data store within a client computing device. In some embodiments, the data store 110 can be a data store of a server system in communication with the client computing device.

Figure 2A:
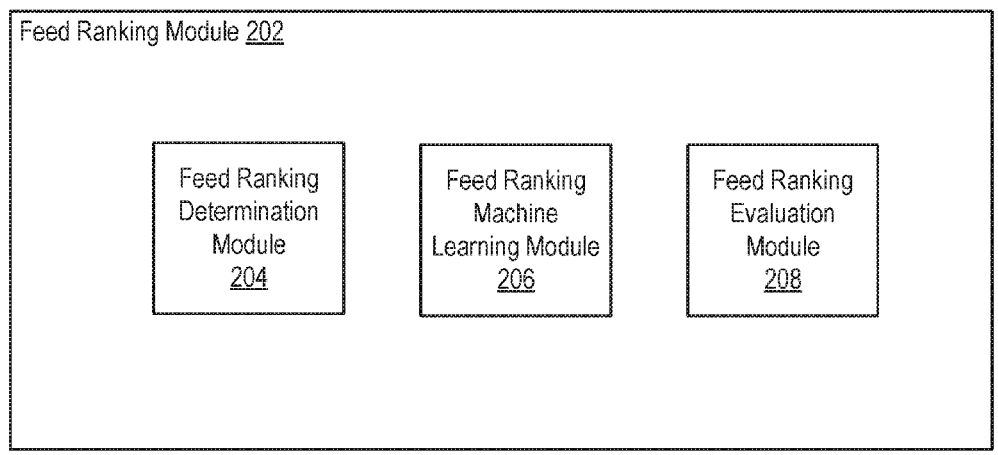
FIG. 2A illustrates an example feed ranking module configured to determine, adjust, or evaluate a ranking model or algorithm for estimating the quality of content items, according to an embodiment of the present technology.

FIG. 2A illustrates an example feed ranking module 202 configured to determine, adjust, or evaluate a ranking model or algorithm for estimating the quality of content items, according to an embodiment of the present technology. In some embodiments, the feed ranking module 106 of FIG. 1 can be implemented with the feed ranking module 202. As shown in the example of FIG. 2A, the feed ranking module 202 can include a feed ranking determination module 204, a feed ranking machine learning module 206, and a feed ranking evaluation module 208.

The feed ranking determination module 204 can determine a ranking model or algorithm for estimating the quality of content items. For example, the feed ranking determination module 204 can determine the ranking model based on pairwise comparison results. The ranking model can assign a score indicative of quality to a content item. The score indicative of quality can be referred to as a "quality score." Quality scores for content items can be used to determine whether to include a content item in a user's feed or not.

In some embodiments, a utility model, such as a random utility model, can be used to determine the ranking model. In a pairwise comparison, a user is presented with two content items. Each content item can be indexed by i, and each content item can have an associated feature vector representation $f_i$. The two content items can be shown side by side in a survey, and the content item shown on the left can be referred to as $c_{left}$, and the content item shown on the right can be referred to as $c_{right}$. Each user can be indexed by j and can have a utility function $U_j(c_i)$ that maps features of each content item to its relevance or quality. This utility function can be referred to as the user's true utility function. When asked to indicate which of the two content items is preferred or higher quality, the user may estimate this quality level but with some error. The error around the true utility can be used as a modeling assumption since human perception can be noisy and emotional/physiological states can affect judgments. In addition, the noise can also serve as a modeling proxy for features that are not explicitly modeled or measured. The noisy estimation can be referred to as the user's perceived utility $V_j(c_i)$. It can be assumed that the noise is normally distributed with mean O and variance $s_e$. The user's perceived utility function can be determined as follows:

$$V_j(c_i) = U_j(c_i) + e \qquad (2),$$

where $U_j(c_i)$ indicates the user's true utility function and e indicates an error around the true utility. Further, it can be assumed that the functions are linear in feature vectors such that:

$$U_j(c_i) = f_i * B_j \qquad (3),$$

where $f_i$ indicates the feature vector representation associated with content item i and $B_j$ indicates user level utility weights. In addition, it can be assumed that that the user level utility weights $B_j$ are drawn from a multivariate normal population distribution with a grand mean $B_M$ and covariance matrix $S_B$. Users can be presented with content items $c_{left}$ and $c_{right}$ (e.g., with known feature vectors), and the users can estimate $V_j(c_{left})$ and $V_j(c_{right})$. The users then can make the choice that reflects their highest perceived utility. From a sample of user choices, a population ranking function (e.g., a vector of weights R) can be recovered and evaluated. For instance, the grand mean $B_M$ can be estimated. Based on the assumptions made, the probability of choosing a content item i as being more relevant than a content item k can be proportional to the true utility difference of the two items. In order to estimate R, a logistic regression can be run with y="did the user choose the content item on the left?" as the binary outcome and the difference in features as the independent variable. For example, the logistic regression can be run as follows:

$$y_{ik} = \text{logit}((f_i - f_k)R) \qquad (4),$$

where $y_{ik}$ indicates the binary outcome of "did the user choose the content item on the left" (e.g., content item i) and $f_i - f_k$ indicates the difference between features of content item i and features of content item k. The recovered R can be used as the ranking function or model. In some cases, this example can be extended to determine or build user-level ranking functions or models. All examples herein are provided for illustrative purposes, and there can be many variations and other possibilities.

The feed ranking determination module 204 can determine weights for features included in the ranking model or algorithm for estimating the quality of content items. For instance, referring to the above example, the weights for features included in the feature vector representation $f_i$ can be estimated or determined based on machine learning using a logistic regression technique, as described in more detail herein. In some embodiments, the weights can be $B_M$ or $B_j$ in the above example. The weights for different features can indicate the relationship between the different features. For example, if the weight for closeness of friends is 0.1 and the weight for probability of commenting on a content item is 0.2, the two weights can indicate that one unit of comment can be equivalent to two units of closeness.

The feed ranking determination module 204 can also determine which features are included in a ranking model or algorithm for estimating the quality of content items. Based on pairwise comparison results, the feed ranking determination module 204 can determine which features associated with content items are good indicators of quality of content items. For example, the feed ranking determination module 204 can determine whether a feature associated with content items correlates with user preference as indicated by the pairwise comparison results. Determining which features of content items are good indicators of quality of content items is explained further in connection with FIG. 3B below. The feed ranking determination module 204 can modify the ranking model to include features that are good indicators of quality of content items and/or to remove features that are not good indicators of quality of content items.

In certain embodiments, a quality score for a content item that is a candidate for being included in a user's feed can include an individual component associated with a particular user. For example, the quality score can be based on an engagement score for a particular user and an engagement score for other users, which can be corrected by a correction term. The engagement score for the particular user can indicate a probability of the user engaging with the content item, and the engagement score for other users can indicate a probability of other users in the population engaging with the content item. The pairwise score for the content item can also be considered in determining the quality score. For example, the pairwise score for the content item can be included in the correction term. In some cases, the individual component for the particular user can be incorporated into the quality score assigned by the ranking model for the content item. In other cases, the individual component for the particular user can be added to the quality score assigned by the ranking model for the content item.

The feed ranking machine learning module 206 can determine weights for a ranking model or algorithm for estimating the quality of content items based on machine learning techniques. In some embodiments, the machine learning techniques can include a logistic regression technique, for example, as described above. The feed ranking determination module 204 can obtain features relating to a training set of content items. The features can be selected in any suitable manner. The feed ranking machine learning module 206 also can obtain pairwise comparison results associated with the training set of content items. In a training phase, the features and pairwise comparison results associated with the training set of content items can be used to train a machine learning model to estimate the quality of content items. Based on training of the machine learning model, the feed ranking machine learning module 206 can determine weights for features to be used in the ranking model or algorithm. The machine learning model can be periodically retrained with new training data and labels to develop and refine the weights. In an evaluation phase relating to content items of unknown quality, a trained machine learning model can estimate quality of the content items, for example, based on determined weights.

The feed ranking evaluation module 208 can test or evaluate a ranking model or algorithm using pairwise comparison results. As mentioned above, the ranking model can be modified to include or remove features associated with content items. Or weights for features included in the ranking model can be changed. In such cases, the feed ranking evaluation module 208 can apply the ranking model to existing pairwise comparison results to determine whether the ranking model can predict the quality of content items accurately. If a ranking model can accurately predict the quality of content items, the predicted quality for content items can agree with the pairwise comparison results involving these content items. The ranking model can be modified or adjusted based on the test or evaluation results, for example, by the feed ranking determination module 204.

Figure 2B:
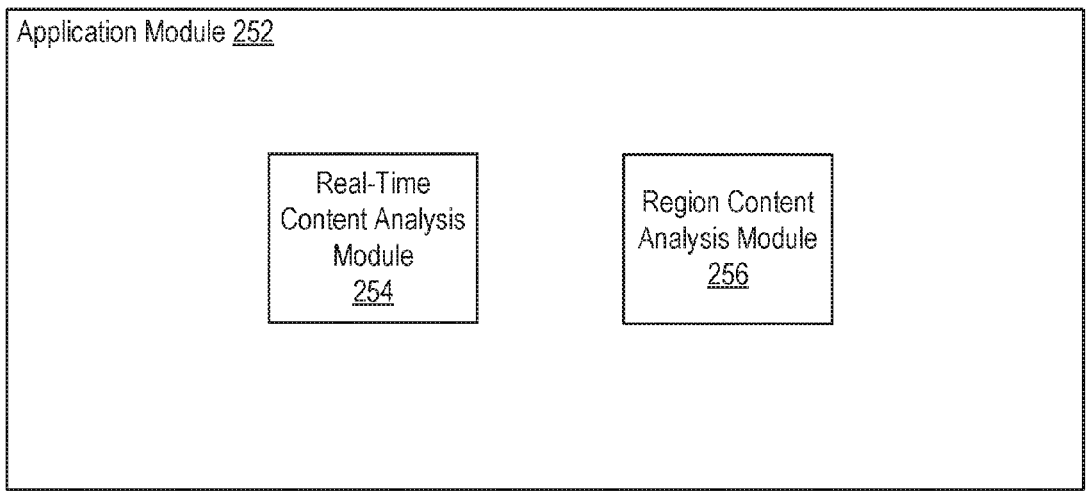
FIG. 2B illustrates an example application module configured to utilize pairwise comparison results for various applications, according to an embodiment of the present technology.

FIG. 2B illustrates an example application module 252 configured to utilize pairwise comparison results for various applications, according to an embodiment of the present technology. In some embodiments, the application module 108 of FIG. 1 can be implemented with the application module 252. As shown in the example of FIG. 2B, the application module 252 can include a real-time content analysis module 254 and a region content analysis module 256.

The real-time content analysis module 254 can analyze content items in or near real time. Content items can become viral and can be shown to a large number of users (e.g., millions of users). However, in some cases, users may not be interested in seeing a viral content item although many users liked, shared, or commented on the content item. One example of such a content item can be a hoax. A viral content item that is a hoax can have many reshares and comments, which would generally indicate the content item might be of interest to users. For example, a conventional ranking model for estimating the quality of content items can assign a high score to the viral content item. However, users may not be interested in seeing viral content items that are hoaxes in their feeds.

The real-time content analysis module 254 can detect viral content items and present to users surveys using pairwise comparisons that include the viral content items. For example, the surveys can include a pairwise comparison showing a viral content item and another content item. The surveys can be displayed to users in or near real time. The real-time content analysis module 254 can obtain pairwise comparison results from the surveys. Based on the pairwise comparison results, the real-time content analysis module 254 can determine whether a viral content item should continue to be included in users' feeds or whether the viral content item should be ranked lower or should not be included in user's feeds. For example, if pairwise comparison results indicate that a large number of users did not select the viral content item, then it can be inferred that users are not interested in seeing the viral content item. For instance, the number of users that selected the viral content item or the pairwise score of the viral content item may fall below a threshold value associated with a selected level of quality. In this instance, the real-time content analysis module 254 can adjust the score assigned by the ranking model to the viral content item such that the viral content item is ranked lower or not included in users' feeds. In certain embodiments, the real-time content analysis module 254 can adjust the ranking model and/or the weights for features included in the ranking model so that the viral content item is ranked lower or not included in users' feeds.

The region content analysis module 256 can use pairwise comparison results to analyze content items in different regions. Regions can include, for example, countries, states, counties, cities, or any other geo-political category. Users in different countries, as an example, can have vastly different preferences for content items. The region content analysis module 256 can analyze pairwise comparison results to determine content type preferences and other preferences for different countries. For example, in one country, users may prefer content items from friends, whereas in another country, users may prefer updates from public pages. Content type preference information can be used in determining the ranking model and/or the weights for features included in the ranking model. For example, different ranking models can be used for different countries if content type preferences vary widely among the countries.

The application module 252 can also use pairwise comparison results for various other applications. In one example, pairwise comparison results can be used for quality assurance or quality metrics. For example, the application module 252 can keep track of whether users agree with the ranking of content items (e.g., in or near real time).

Figure 3A:
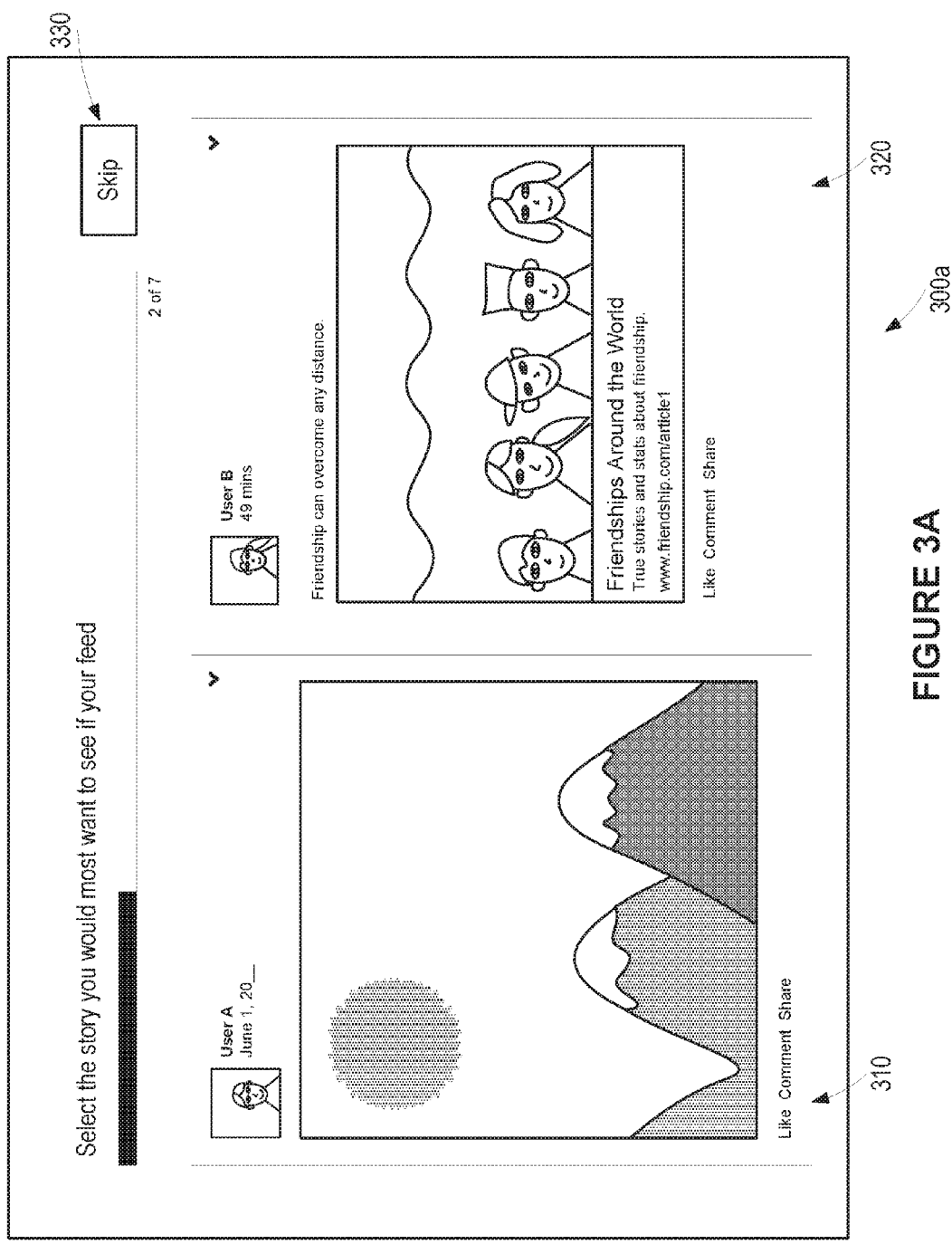
FIG. 3A illustrates an example user interface for providing pairwise comparisons for surveys, according to an embodiment of the present technology.

FIG. 3A illustrates an example user interface 300a for providing pairwise comparisons for surveys, according to an embodiment of the present technology. The user interface 300a shows a pairwise comparison in a survey associated with a feed of a user. A survey can include one or more pairwise comparisons, and in the example of FIG. 3A, the survey includes seven pairwise comparisons of which the second pairwise comparison is currently shown to the user. The pairwise comparison can include a first or left content item 310 and a second or right content item 320. In one example, the two content items in the pairwise comparison can be selected from posts by the user's friends. For example, the left content item 310 is from User A, and the left content item 320 is from User B. The user can select either the left content item 310 or the right content item 320, but not both. In some cases, the user can skip the pairwise comparison, for example, by clicking a skip button 330.

Figure 3B:
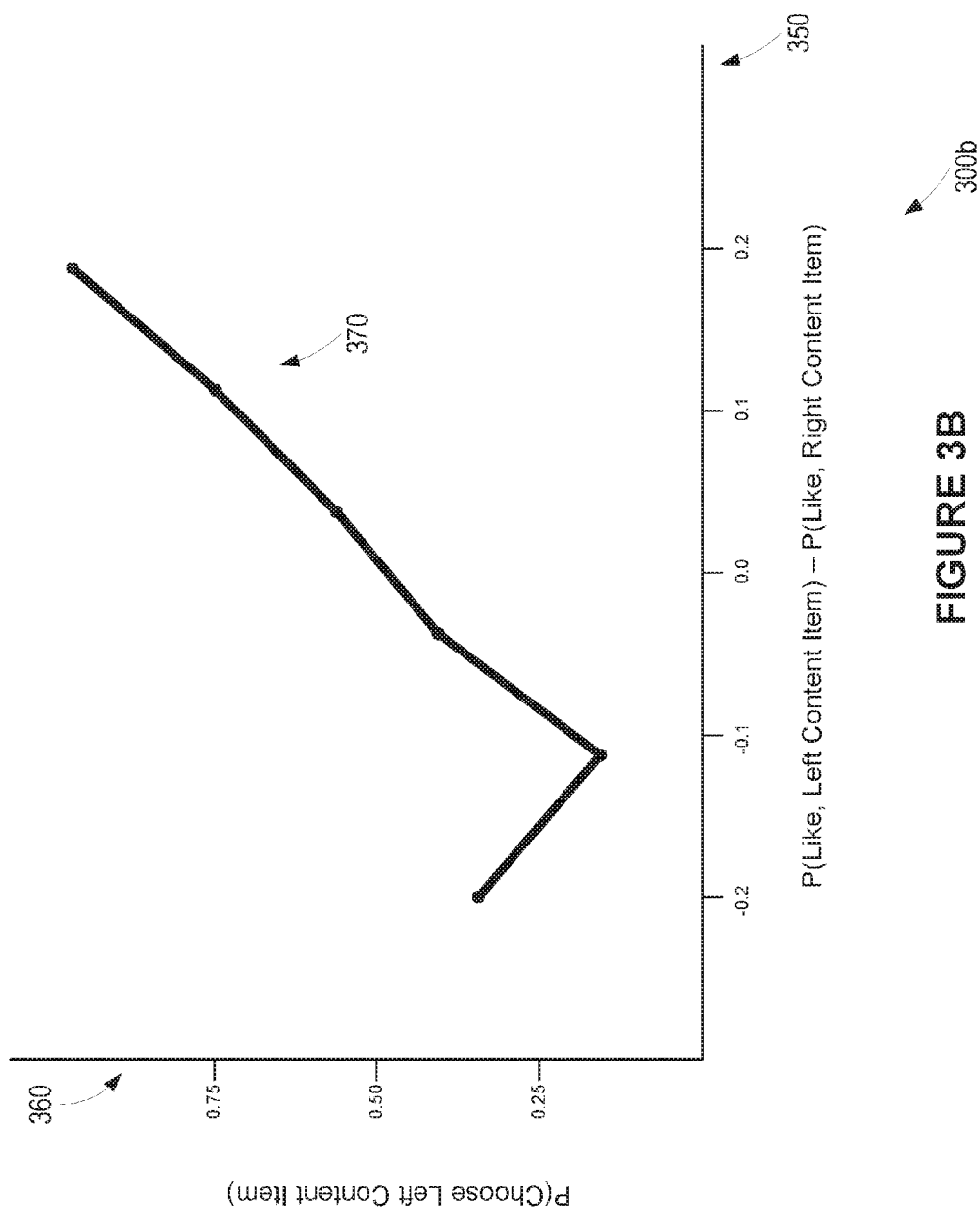
FIG. 3B illustrates an example chart used to determine features that are indicative of quality of content items, according to an embodiment of the present technology.

FIG. 3B illustrates an example chart 300b used to determine features that are indicative of quality of content items, according to an embodiment of the present technology. In order to determine whether a feature associated with content items is indicative of quality of content items, it can be determined whether a strong correlation exists between a feature and user preference data indicated by pairwise comparison results. In some embodiments, the determination of whether a feature is indicative of quality of content items can be made based on a chart, such as the example chart 300b shown in FIG. 3B. In the example of FIG. 3B, the feature being analyzed is the probability of liking a content item, but any other features associated with content items can be analyzed. In the example of FIG. 3B, the x-axis 350 of the chart 300b relates to a difference between a probability of liking a left content item and a probability of liking a right content item. The difference can be indicated as P(like, left content item)−P(like, right content item). In the example of FIG. 3B, the y-axis 360 of the chart 300b relates to a probability of a user choosing the left content item. The probability of a user choosing the left content item can be indicated as P(choose left content item). As P(like, left content item)−P(like, right content item) increases on the x-axis 350, P(like, left content item) can become higher than P(like, right content item). For a feature that highly correlates with the pairwise comparison results, P(choose left content item) should increase as a value associated with the feature on the x-axis increases. In the example of FIG. 3B, the plotted line 370 shows that P(choose left content item) increases as P(like, left content item)−P(like, right content item) increases, which can indicate that the feature of probability of liking a content item is a good indicator of quality of content items.

FIG. 4 illustrates an example first method 400 for providing pairwise comparisons for surveys, according to an embodiment of the present disclosure. It should be understood that there can be additional, fewer, or alternative steps performed in similar or alternative orders, or in parallel, based on the various features and embodiments discussed herein unless otherwise stated.

At block 402, the example method 400 can select a first content item and a second content item to display to each user of a plurality of users in pairwise comparison in a survey associated with a content feed of the user. At block 404, the example method 400 can obtain a selection via a user interface by each user of the plurality of users of one of the first content item and the second content item. At block 406, the example method 400 can determine a ranking model configured to assign a score indicative of quality of each content item of a plurality of content items associated with content feeds based at least in part on the selections by the plurality of users. Other suitable techniques that incorporate various features and embodiments of the present technology are possible.

Figure 5:
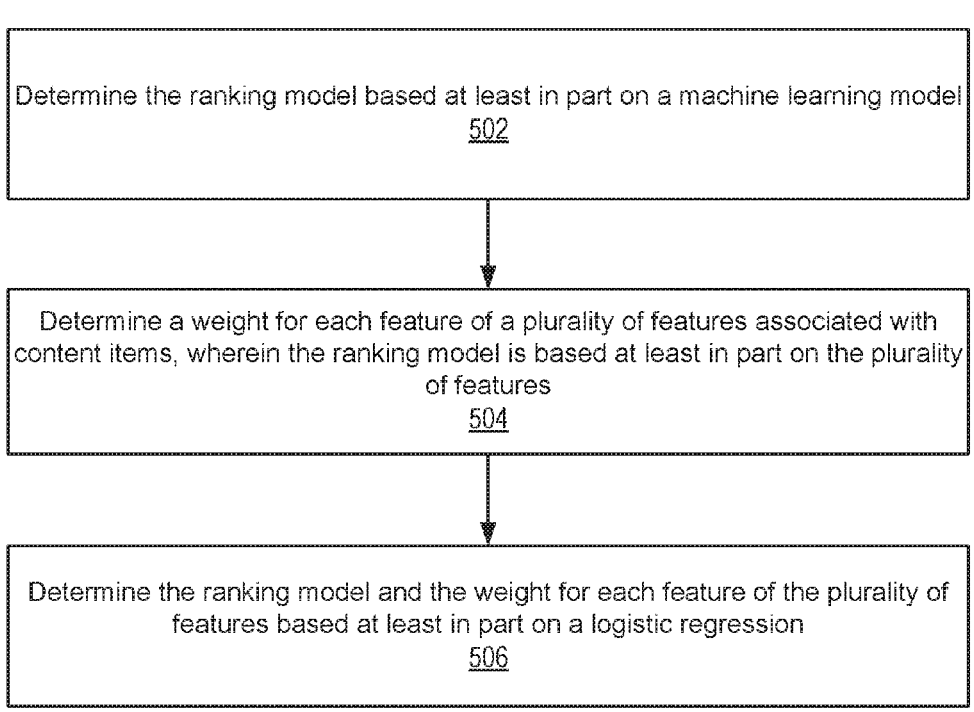
FIG. 5 illustrates an example second method for providing pairwise comparisons for surveys, according to an embodiment of the present technology.

FIG. 5 illustrates an example second method 500 for providing pairwise comparisons for surveys, according to an embodiment of the present disclosure. It should be understood that there can be additional, fewer, or alternative steps performed in similar or alternative orders, or in parallel, based on the various features and embodiments discussed herein unless otherwise stated. Certain steps of the method 500 may be performed in combination with the example method 400 explained above.

At block 502, the example method 500 can determine the ranking model based at least in part on a machine learning model. The ranking model can be similar to the ranking model explained in connection with FIG. 4. At block 504, the example method 500 can determine a weight for each feature of a plurality of features associated with content items, wherein the ranking model is based at least in part on the plurality of features. At block 506, the example method 500 can determine the ranking model and the weight for each feature of the plurality of features based at least in part on a logistic regression. Other suitable techniques that incorporate various features and embodiments of the present technology are possible.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
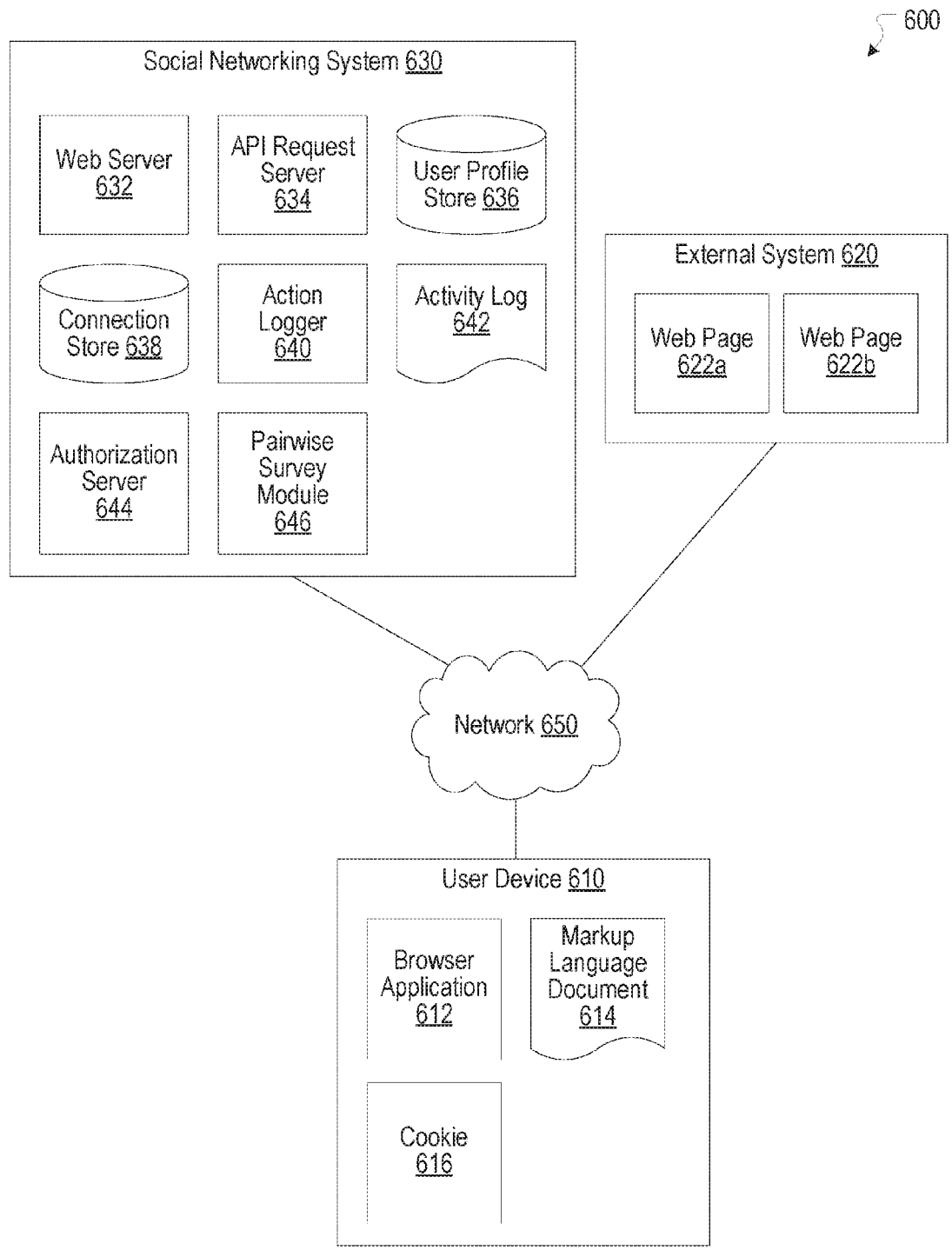
FIG. 6 illustrates a network diagram of an example system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML).

In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a pairwise survey module 646. The pairwise survey module 646 can be implemented with the pairwise survey module 102, as discussed in more detail herein. In some embodiments, one or more functionalities of the pairwise survey module 646 can be implemented in the user device 610.

Hardware Implementation

Figure 7:
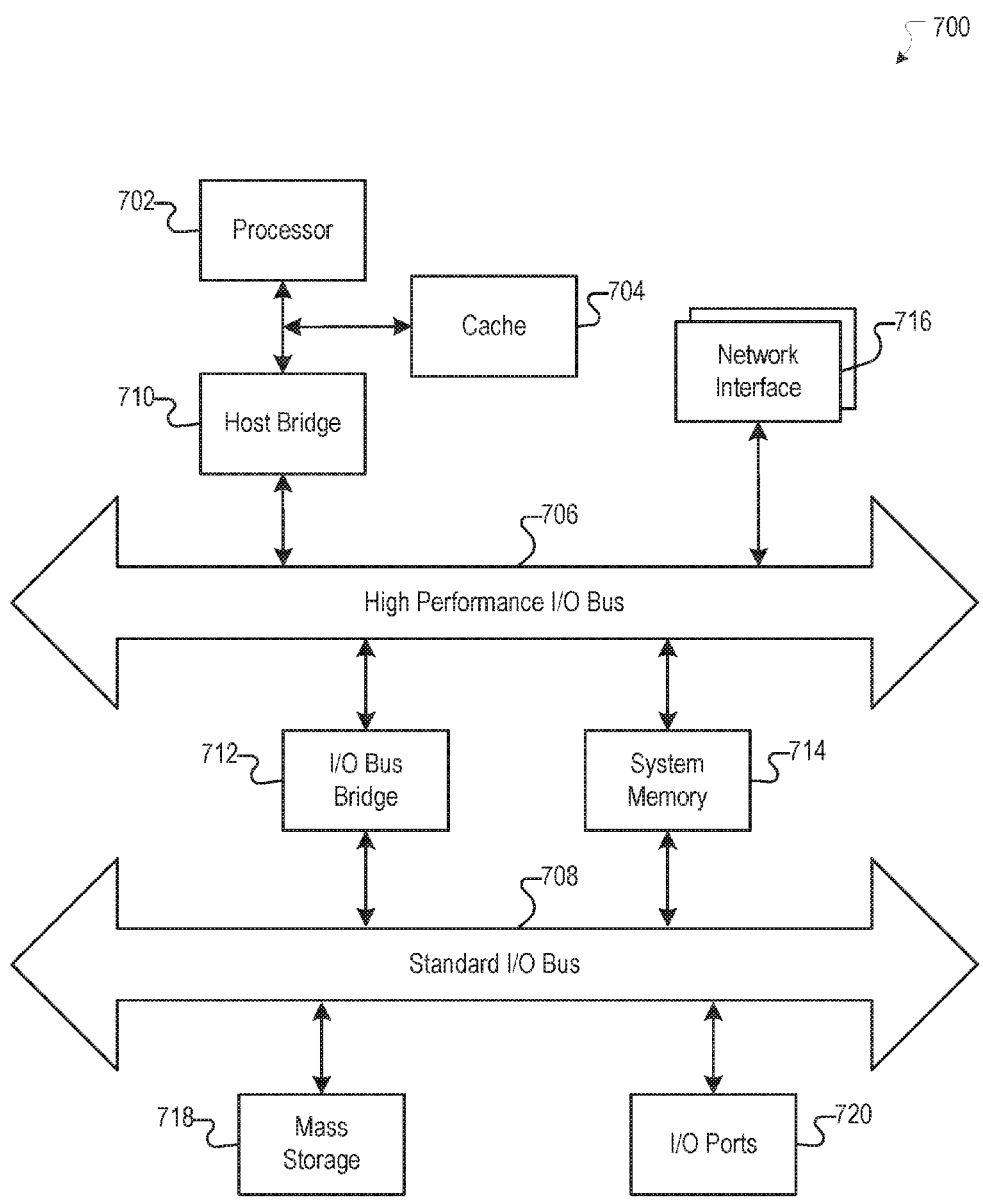
FIG. 7 illustrates an example of a computer system that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   selecting, by a computing system, a first content item and a second content item to display to each user of a plurality of users in pairwise comparison in a survey associated with a content feed of the user having a user account on a social network system,
   wherein the first content item and the second content item in the pairwise comparison in the survey are selected from content items posted by an entity having an association with the user account via the social network system;
   obtaining, by the computing system, a selection via a user interface by each user of the plurality of users of one of the first content item and the second content item; and
   determining, by the computing system, a ranking model configured to assign a score indicative of quality of each content item of a plurality of content items associated with content feeds based at least in part on the selections by the plurality of users.

2. The computer-implemented method of claim 1, wherein the ranking model is determined based at least in part on a machine learning model.

3. The computer-implemented method of claim 1, wherein the ranking model is based at least in part on a plurality of features associated with content items, and the determining the ranking model comprises determining a weight for each feature of the plurality of features.

4. The computer-implemented method of claim 3, wherein the ranking model and the weight for each feature of the plurality of features are determined based at least in part on a utility function.

5. The computer-implemented method of claim 3, wherein the ranking model and the weight for each feature of the plurality of features are determined based at least in part on a logistic regression.

6. The computer-implemented method of claim 1, further comprising providing the survey to each user in real time, wherein the first content item is a viral content item.

7. The computer-implemented method of claim 6, further comprising:
   assigning a first score indicative of quality of the first content item to the first content item based at least in part on the ranking model;
   determining whether selections of the first content item by the plurality of users are below a threshold; and
   adjusting the first score in response to determining that the selections of the first content item by the plurality of users are below the threshold.

8. The computer-implemented method of claim 1, further comprising:
   modifying the ranking model;
   assigning, using the modified ranking model, scores indicative of quality of content items included in the survey associated with the content feed of each user; and
   comparing the assigned scores of the content items included in the survey and the selections by the plurality of users.

9. The computer-implemented method of claim 1, wherein the plurality of users are located in a plurality of geographical areas and the method further comprises analyzing the selections by one or more of the plurality of users in a particular geographical area of the plurality of geographical areas.

10. The computer-implemented method of claim 9, wherein the determining the ranking model comprises determining a ranking model associated with the particular geographical area.

11. A system comprising:
    at least one hardware processor; and a memory storing instructions that, when executed by the at least one processor, cause the system to perform:

selecting a first content item and a second content item to display to each user of a plurality of users in pairwise comparison in a survey associated with a content feed of the user having a user account on a social network system, wherein the first content item and the second content item in the pairwise comparison in the survey are selected from content items posted by an entity having an association with the user account via the social network system;

obtaining a selection via a user interface by each user of the plurality of users of one of the first content item and the second content item; and determining a ranking model configured to assign a score indicative of quality of each content item of a plurality of content items associated with content feeds based at least in part on the selections by the plurality of users.

12. The system of claim 11, wherein the ranking model is determined based at least in part on a machine learning model.

13. The system of claim 11, wherein the ranking model is based at least in part on a plurality of features associated with content items, and the determining the ranking model comprises determining a weight for each feature of the plurality of features.

14. The system of claim 13, wherein the ranking model and the weight for each feature of the plurality of features are determined based at least in part on a utility function.

15. The system of claim 13, wherein the ranking model and the weight for each feature of the plurality of features are determined based at least in part on a logistic regression.

16. The non-transitory computer readable medium of claim 13, wherein the ranking model and the weight for each feature of the plurality of features are determined based at least in part on a utility function.

17. The non-transitory computer readable medium of claim 13, wherein the ranking model and the weight for each feature of the plurality of features are determined based at least in part on a logistic regression.

18. A non-transitory computer readable medium including instructions that, when executed by at least one hardware processor of a computing system, cause the computing system to perform a method comprising:

selecting a first content item and a second content item to display to each user of a plurality of users in pairwise comparison in a survey associated with a content feed of the user having a user account on a social network system, wherein the first content item and the second content item in the pairwise comparison in the survey are selected from content items posted by an entity having an association with the user account via the social network system;

obtaining a selection via a user interface by each user of the plurality of users of one of the first content item and the second content item; and determining a ranking model configured to assign a score indicative of quality of each content item of a plurality of content items associated with content feeds based at least in part on the selections by the plurality of users.

19. The non-transitory computer readable medium of claim 11, wherein the ranking model is determined based at least in part on a machine learning model.

20. The non-transitory computer readable medium of claim 11, wherein the ranking model is based at least in part on a plurality of features associated with content items, and the determining the ranking model comprises determining a weight for each feature of the plurality of features.

* * * * *